US009104628B2

(12) United States Patent
Zhu et al.

(10) Patent No.: US 9,104,628 B2
(45) Date of Patent: *Aug. 11, 2015

(54) ARRAY OBJECT CONCURRENCY IN STM

(71) Applicant: Microsoft Technology Licensing, LLC, Redmond, WA (US)

(72) Inventors: Weirong Zhu, Kirkland, WA (US); David L. Detlefs, Issaquah, WA (US); Yosseff Levanoni, Redmond, WA (US); Lingli Zhang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,119

(22) Filed: Jan. 10, 2015

(65) Prior Publication Data

US 2015/0127915 A1    May 7, 2015

Related U.S. Application Data

(63) Continuation of application No. 12/243,371, filed on Oct. 1, 2008, now Pat. No. 8,954,995.

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06F 12/14* | (2006.01) | |

(52) U.S. Cl.
CPC ............ *G06F 12/1466* (2013.01); *G06F 9/467* (2013.01); *G06F 2212/1052* (2013.01)

(58) Field of Classification Search
None
See application file for complete search history.

(56) References Cited

U.S. PATENT DOCUMENTS

| | | |
|---|---|---|
| 6,324,680 B1 | 11/2001 | Barnfield et al. |
| 6,405,292 B1 | 6/2002 | Joseph et al. |
| 6,988,099 B2 | 1/2006 | Wiser et al. |
| 7,328,316 B2 | 2/2008 | Moir et al. |
| 8,176,022 B1 | 5/2012 | Garcia |
| 2005/0149526 A1 | 7/2005 | Wiser et al. |
| 2007/0282838 A1 | 12/2007 | Shavit et al. |
| 2008/0021934 A1 | 1/2008 | Hudson et al. |
| 2009/0182837 A1 | 7/2009 | Rogers |
| 2010/0057792 A1 | 3/2010 | Ylonen |

OTHER PUBLICATIONS

"Final Office Action Received in U.S. Appl. No. 12/243,371", Mailed Date: Aug. 17, 2012, 17 Pages.
"Non-Final Office Action Received in U.S. Appl. No. 12/243,371", Mailed Date: May 7, 2014, 23 Pages.
"Non-Final Office Action Received in U.S. Appl. No. 12/243,371", Mailed Date: Mar. 15, 2012, 16 Pages.

(Continued)

*Primary Examiner* — Craig Dorais
(74) *Attorney, Agent, or Firm* — Kevin Sullivan; Kate Drakos; Micky Minhas

(57) ABSTRACT

A software transactional memory system is provided that creates an array of transactional locks for each array object that is accessed by transactions. The system divides the array object into non-overlapping portions and associates each portion with a different transactional lock. The system acquires transactional locks for transactions that access corresponding portions of the array object. By doing so, different portions of the array object can be accessed by different transactions concurrently. The system may use a shared shadow or undo copy for accesses to the array object.

20 Claims, 7 Drawing Sheets

(56) References Cited

OTHER PUBLICATIONS

"Notice of Allowance Received for U.S. Appl. No. 12/243,371", Mailed Date: Sep. 17, 2014, 13 Pages.

"Aspects of Building an Object-Oriented Database Management Systems (OODBMS)", Jul. 31, 2008, 8 Pages.

Adl-Tabatabai, et al., "Unlocking Concurrency", ACM Queue, Dec. 2006, pp. 24-33.

Felber, et al., "Dynamic Performance Tuning of Word-Based Software Transactional Memory", In Proceedings of the 13th ACM SIGPLAN Symposium on Principles and Practice of Parallel Programming, Feb. 20, 2008, 9 Pages.

Herlihy, et al., "A Flexible Framework for Implementing Software Transactional Memory", In Proceedings of the 21st Annual ACM SIGPLAN Conference on Object-Oriented Programming Systems, Languages and Applications, vol. 41, Issue 10, Oct. 16, 2006, 9 Pages.

Marathe, et al., "Design Tradeoffs in Modern Software Transactional Memory Systems", In Proceedings of the 7th Workshop on Languages, Compilers, and Run-time Support for Scalable Systems, Oct. 22, 2004, 7 Pages.

Spear, et al., "Inevitability Mechanisms for Software Transactional Memory", In Proceedings of the 3rd ACM SIGPLAN Workshop on Transactional Computing, Feb. 11, 2008, 9 Pages.

ARRAY OBJECT CONCURRENCY IN STM

CROSS-REFERENCE TO RELATED APPLICATION(S)

This application is a continuation of U.S. patent application Ser. No. 12/243,371, entitled "ARRAY OBJECT CONCURRENCY IN STM," filed Oct. 1, 2008, which is incorporated herein by reference in its entirety.

BACKGROUND

Computer programs may be written to allow different portions (e.g., threads) of the program to be executed concurrently. In order to execute different portions of the program concurrently, the computer system or the program typically includes some mechanism to manage the memory accesses of the different portions to ensure that the parts access common memory locations in the desired order.

Transactional memory systems allow programmers to designate transactions in a program that may be executed as if the transactions are executing in isolation (i.e., independently of other transactions and other sequences of instructions in the program). Transaction memory systems manage the memory accesses of transactions by executing the transactions in such a way that the effects of the transaction may be rolled back or undone if two or more transactions attempt to access the same memory location in a conflicting manner. Transaction memory systems may be implemented using hardware and/or software components.

Transactional memory systems that extend an object-oriented language typically detect conflicts between memory accesses of different transactions at an object granularity. Such systems detect a conflicting access to an object even when different transactions are referencing different fields within the object. Where an array is considered a single object (i.e., an array object), the systems detect concurrent accesses to different elements of an array object a conflict and cause the accesses to be serialized. By serializing accesses to an array object, the system forgoes opportunities for exploiting parallel or concurrent accesses to the array object.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A software transactional memory system is provided that creates an array of transactional locks for each array object that is accessed by transactions. The system divides the array object into non-overlapping portions and associates each portion with a different transactional lock. The system acquires transactional locks for transactions that access corresponding portions of the array object. By doing so, different portions of the array object can be accessed by different transactions concurrently. The system may use a shared shadow or undo copy for accesses to the array object.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
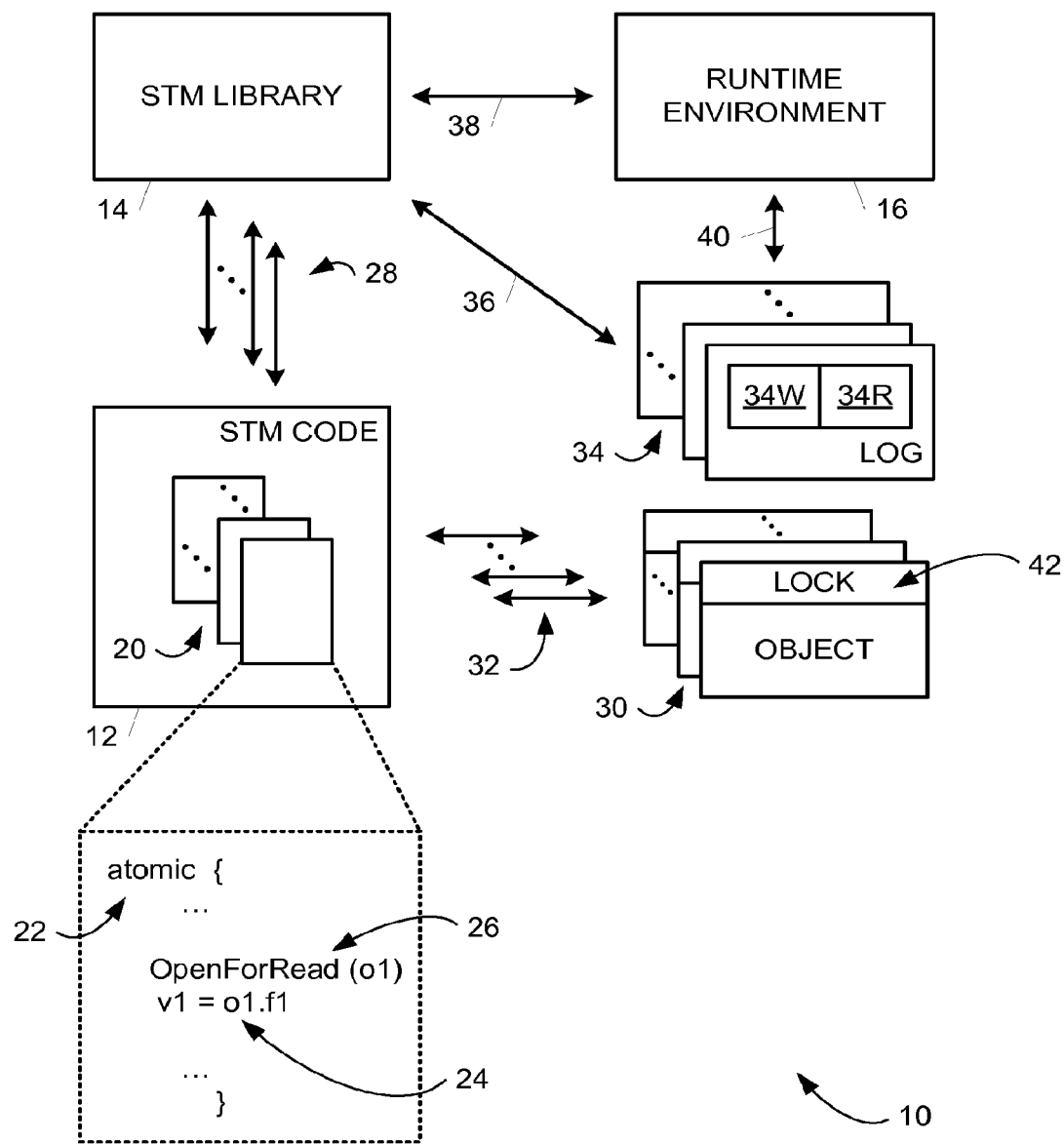
FIG. 1 is a block diagram illustrating an embodiment of a software transactional memory system that creates an array of transactional locks for each array object.
Figure 2:
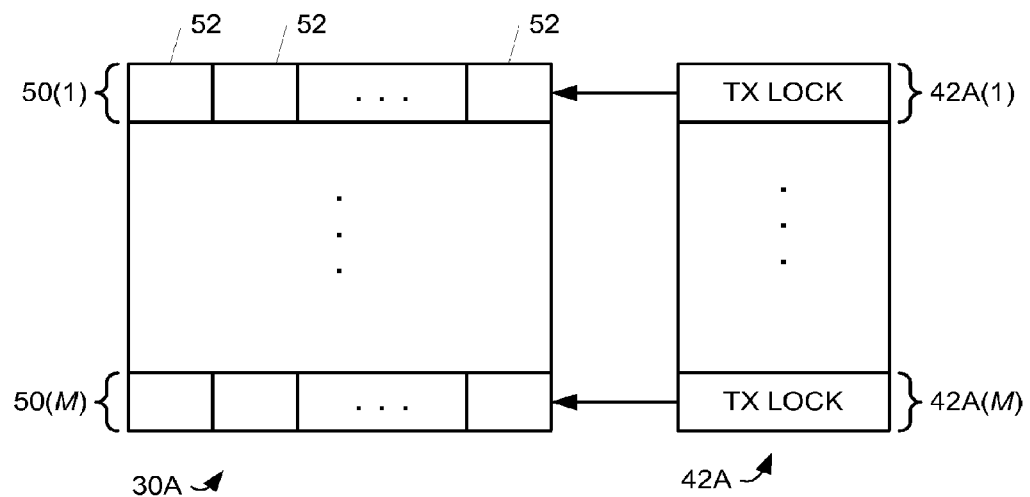
FIG. 2 is a block diagram illustrating an embodiment of an array of transactional locks for an array object.

FIG. 1 is a block diagram illustrating an embodiment of a software transactional memory (STM) system 10 that creates an array of transactional locks 42A for each array object 30A (shown in FIG. 2).

STM system 10 represents a runtime mode of operation in a computer system, such as computer system 100 shown in FIG. 7 and described in additional detail below, where the computer system is executing instructions to run STM code 12. STM system 10 includes STM code 12, an STM library 14, and a runtime environment 16. STM system 10 is configured to manage the execution of STM transactions 20 that form atomic blocks in STM code 12 to allow transactions 20 to be executed atomically and, if desired, rollback or undo changes made by transactions 20. To do so, STM system 10 tracks memory accesses by transactions 20 to objects 30.

STM code 12 includes a set of one or more transactions 20. Each transaction 20 includes a sequence of instructions that is designed to execute atomically, i.e., as if the sequence is executing in isolation from other code in STM code 12. Each transaction 20 includes an atomic block designator 22 that indicates that a corresponding portion of STM code 12 is a transaction 20. Each transaction 20 also includes zero or more memory accesses 24 that read from and/or write to objects 30 as indicated by arrows 32. Transactions 20 also include invocations 26 of STM primitives, added by a compiler such as a compiler 82 shown in FIGS. 5 and 7 and described in additional detail below, that call functions in STM library 14, and the STM primitives of STM library 14 return results to transactions 20 as indicated by function calls and returns 28.

STM library 14 includes instructions executable by the computer system in conjunction with runtime environment 16 to implement a transactional memory system.

The STM primitives of STM library 14 that are callable by transactions 20 include management primitives that implement start, commit, abort, and retry functions in STM library 14. A transaction 20 calls the start function to initiate the management of the transaction 20 by STM library 14. A transaction 20 calls the commit function to finalize the results of the transaction 20 in memory system 104, if successful. A transaction 20 calls the abort function to roll back or undo the results of the transaction 20 in memory system 104. A transaction 20 calls the retry function to retry the transaction 20.

The STM primitives of STM library 14 that are callable by transactions 20 also include memory access primitives that manage accesses to objects 30 that are written and/or read by a transaction 20. The memory access primitives of STM library 14 generate and manage an STM log 34 for each transaction currently being executed. Each STM log 34 includes a write log 34W and a read log 34R. The memory access primitives also access a set of one or more transactional locks 42 for each object 30 that lock or unlock each object 30 or portions of each object 30 for writing and/or reading. For each non-array object 30, the memory access primitives access a single transactional lock 42 that locks or unlocks the non-array object 30 for writing and/or reading. For each array object 30A (shown in FIG. 2), the memory access primitives access a set of one or more transactional lock 42 where each transaction lock 42 in the set locks or unlocks a corresponding portion of the array object 30A for writing and/or reading as described in additional detail below. Runtime environment 16 creates and manages the transactional lock(s) 42 for each object 30.

To access an object 30 for writing in a memory system 104, the transaction 20 invokes a memory access primitive to open the object 30 for writing. STM library 14 acquires a transactional lock 42 corresponding to the object 30 for the transaction 20 if the lock is available. If the object 30 is locked by another transaction 20, then STM library 14 detects a conflict between the current transaction 20 and the other transaction 20 and may rollback and re-execute the current transaction 20. If the object 30 is locked by the current transaction 20, then STM library 14 has already acquired the transactional lock 42 corresponding to the object 30 for the transaction 20. STM library 14 releases the transactional lock 42 in response to the transaction 20 committing.

To access an object 30 for reading in a memory system 104, the transaction 20 invokes a memory access primitive to open the object 30 for reading. If the object 30 is not locked, STM library 14 may, in some embodiments, store a current version number of the object 30 into read log 34R (e.g., to implement an optimistic read) or acquire a transactional lock 42 for the object 30 for the transaction 20 (e.g., to implement a pessimistic read). If the object 30 is locked by another transaction 20, then STM library 14 detects a conflict between the current transaction 20 and the other transaction 20 and may rollback and re-execute the current transaction 20. If the object 30 is locked by the current transaction 20, then STM library 14 may store a current version number of the object 30 into read log 34R or set a flag corresponding to the object 30 in write log 34W to indicate that the object 30 was also read. STM library 14 releases the transactional lock 42, if used, in response to the transaction 20 committing.

STM library 14 is configured to operate in a buffered write mode of operation and/or an in-place write mode of operation.

In the buffered write mode of operation, STM library 14 causes write accesses 32 by each transaction 20 to be made to shadow copies (not shown) of objects 30 once corresponding transactions locks 42 are acquired. Each write access 32 executed by a transaction 20 writes directly to a shadow copy indicated by the write access and causes an indication of the write access 32 to be stored in log 34W as indicated by arrow 36. For non-array objects 30, the shadow copy may be stored in log 34W. For array objects 30, a shared shadow copy may be stored separately from log 34W. STM library 14 causes read accesses 32 that occur after a designated object 30 has been opened for writing by each transaction 20 to be made from the shadow copies and causes indications of the read accesses 32 to be stored in log 34R as indicated by arrow 36. STM library 14 causes read accesses 32 that occur before a designated object 30 has been opened from writing by each transaction 20 to be made directly from objects 30 and causes indications of the read accesses 32 to be stored in log 34R as indicated by arrow 36. STM library 14 adds each write and read access 32 from a transaction 20 to logs 34W and 34R, respectively, as indicated by arrow 36. STM library 14 uses log 34W to cause shadow copies to be stored into objects 30 in response to transaction 20 committing successfully. STM library 14 uses log 34W to cause the shadow copies to be discarded in response to transaction 20 being rolled back or aborted. STM library 14 uses log 34R to validate read accesses and for retry operations.

In the in-place write mode of operation, STM library 14 causes memory accesses 32 by each transaction 20 to be made directly to objects 30 in memory system 104 once corresponding transactions locks 42 are acquired. Each write access 32 executed by transaction 20 writes directly to an object 30 indicated by the write access and causes an indication of the write access 32 to be stored in log 34W as indicated by an arrow 36. For non-array objects 30, an undo copy may be stored in log 34W. For array objects 30, a shared undo copy may be stored separately from log 34W. Each read access 32 executed by transaction 20 reads directly from an object 30 indicated by the read access and causes an indication of the read access 32 to be stored in log 34R as indicated by arrow 36. STM library 14 uses the undo copies in log 34W to roll back the transaction 20 in response to transaction 20 being aborted. STM library 14 uses log 34R to validate read accesses and for retry operations.

Runtime environment 16 may be any suitable combination of runtime libraries, a virtual machine (VM), an operating system (OS) functions, such as functions provided by an OS 122 shown in FIG. 7 and described in additional detail below, and/or compiler functions, such as functions provided by compiler 82 shown in FIGS. 5 and 7 and described in additional detail below.

Objects 30 include array objects 30A such as the array object 30A shown in FIG. 2. STM system 10 creates an array 42A of transactional locks 42A(1)-42(M) for each array object 30A that is accessed by transactions as shown in FIG. 2 where M is an integer greater than or equal to one and may be the same or different for each array object 30A. STM system 10 divides array object 30A into non-overlapping portions 50(1)-50(M) where each portion 50 includes a set of one or more elements 52 of the array. STM system 10 associates each portion 50(1)-50(M) with a respective transactional lock 42A(1)-42A(M). STM system 10 acquires transactional locks 42A(1)-42A(M) for transactions 20 that access corresponding portions 50(1)-50(M) of array object 30A to allow different portions 50 of array object 30A to be accessed by different transactions 20 concurrently.

Figure 3A:
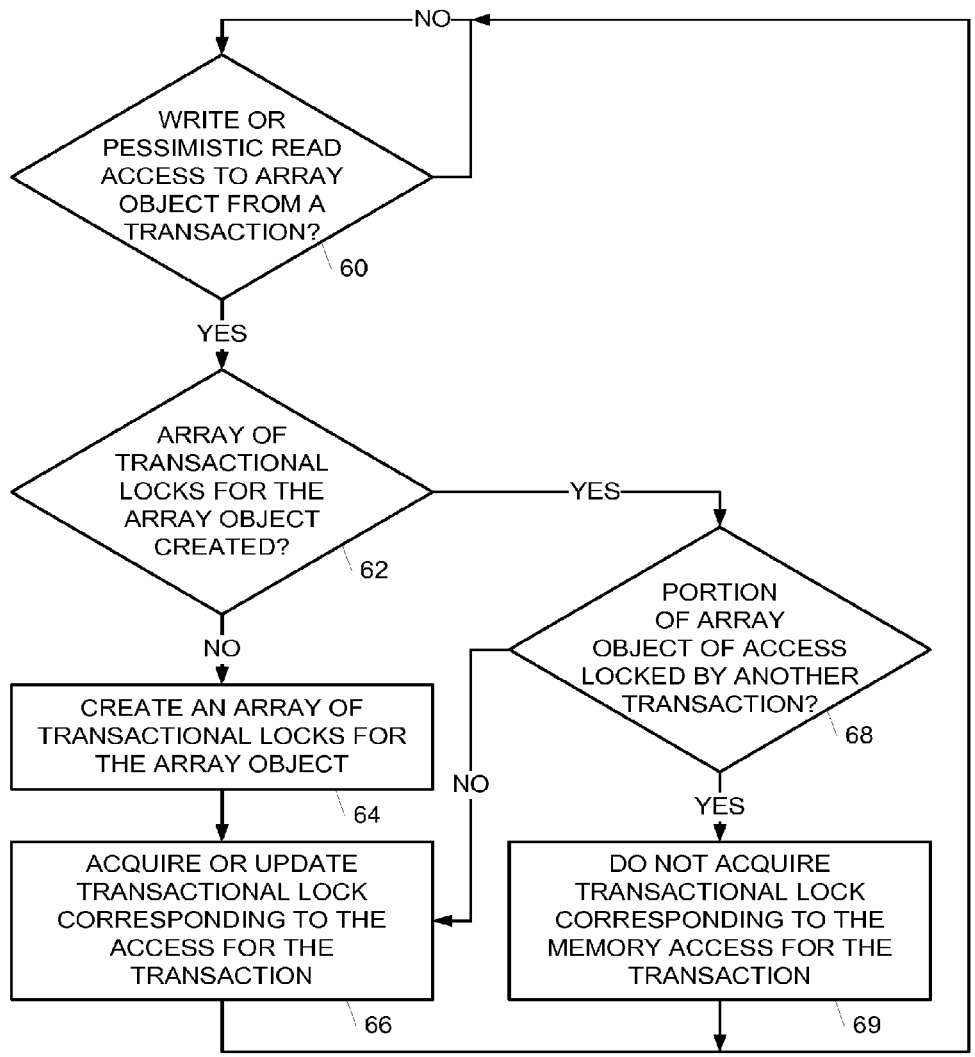
FIGS. 3A-3B are flow charts illustrating embodiments of methods for accessing an array object.
Figure 3B:
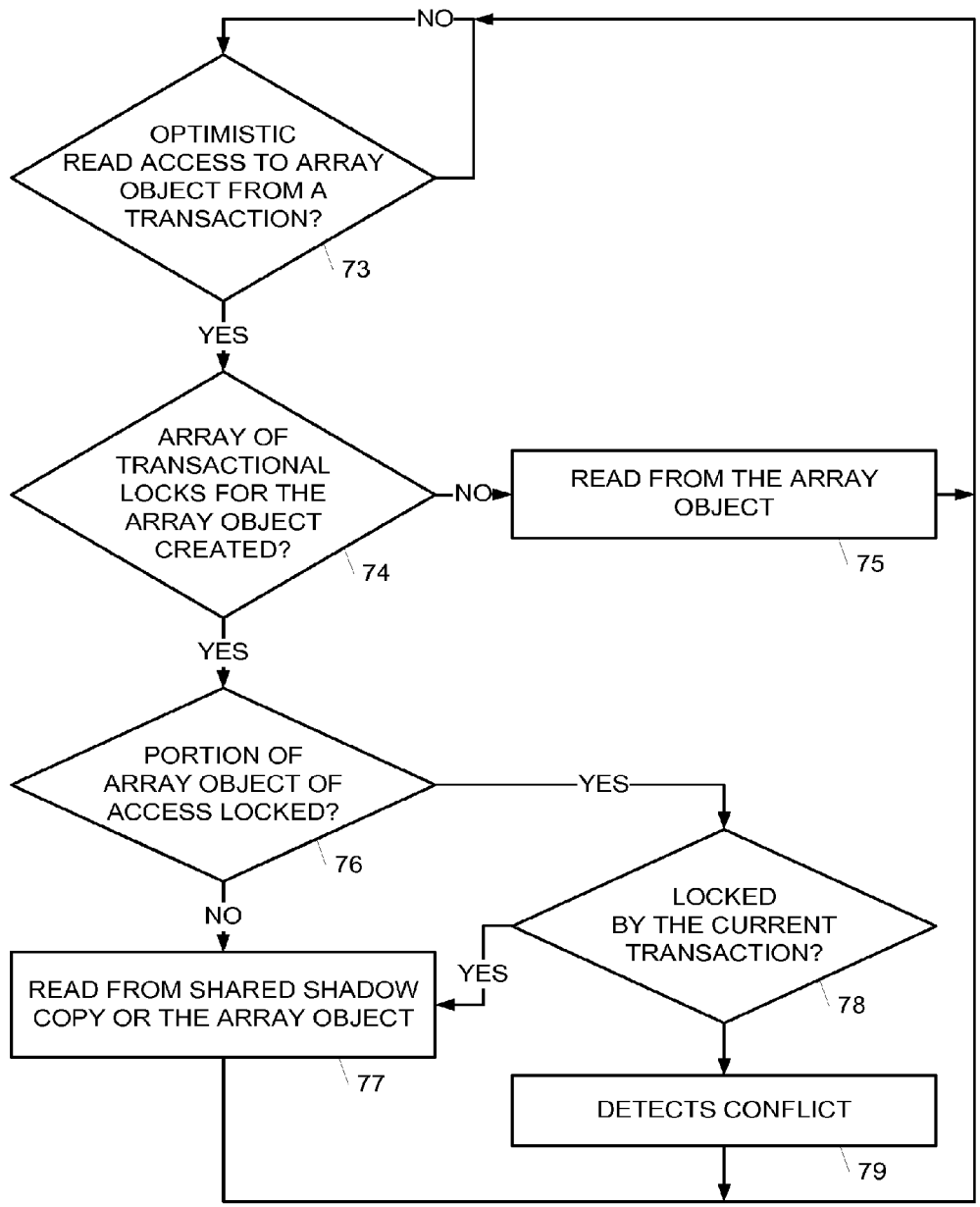

FIGS. 3A-3B are flow charts illustrating embodiments of methods for accessing an array object 30A. FIG. 3A illustrates write and pessimistic read accesses to an array object 30A, and FIG. 3B illustrates optimistic read accesses to an array object 30A.

In FIG. 3A, a determination is made by STM library 14 as to whether a write access or a pessimistic read access to an array object 30A from a transaction 20 is detected as indicated in a block 60. When STM library 14 detects a write or a pessimistic read access to an array object 30A from a transaction 20, STM library 14 determines whether an array 42A of transactional locks for array object 30A have been created as indicated in a block 62. If array 42A of transactional locks has not been created for array object 30A, then STM library 14 creates an array 42A of transactional locks for array object 30A as indicated in a block 64. To do so, STM library 14 divides array object 30A into portions 50(1)-50(M) with respective mutually exclusive subsets of elements 52 in respective contiguous memory regions.

STM library 14 selects subsets of elements 52 to include in portions 50(1)-50(M) using any suitable algorithm. For array objects 30A below a size threshold (e.g., a memory size such as 128 bytes or number of elements size such as 4 elements), the algorithm may allocate a single transactional lock 42A for the array object 30A. For array objects 30A larger that the size threshold, the algorithm may select the size of each portion 50 (e.g., a memory size such as 128 bytes or number of elements size such as 4 elements) using a default value or a hint provided from a user or compiler 82. Depending on the size selected for portions 50 and the size of array object 30A, the Mth portion 50(M) may be the same size or larger than the remaining portions 50(1)-50(M−1). STM library 14 divides array object 30A logically such that each element 52 belongs to only one portion 50 (i.e., elements 52 are not split into different portions 50).

In some embodiments, programmers may have knowledge of how elements 52 in an array object 30A are distributed to concurrent computation tasks (e.g. threads). Such knowledge may be a hint for STM system 10 in deciding the granularity of concurrency control on array object 30A. STM system 10 may expose application program interfaces (APIs) to programmers or compiler 82 for indicating such hints. The number of chunks that an array object 30A will be decomposed into is one example of such a hint. Such hints may also be useful for optimizations of compiler 82.

As noted above STM library 14 divides array object 30A logically such that each element 52 belongs to only one portion 50 (i.e., elements 52 are not split into different portions 50). When portion 50 boundaries coincide with element 52 boundaries and the portion size is selectable by compiler 82, compiler 82 may be able to optimize the execution of transactions 20. For example, a loop may iterate sequentially over loop indices and access array elements in order. Compiler 82 may transform this loop into a two level loop nest, such that the outer loop iterates over portions 50, and the inner loop iterates over elements 52 within a portion 50. Therefore, for each iteration of the outer loop, compiler 82 may generate only one read or write barrier to access transactional lock 42A for the specified portion 50.

STM library 14 associates transactional locks 42A(1)-42A(M) with respective portions 50(1)-50(M) so that each transactional lock 42A(1)-42A(M) corresponds to a different portion 50(1)-50(M) of the array object 30A. STM library 14 may store transactional locks 42A(1)-42A(M) at known locations relative to a corresponding array object 30A or other locations that may otherwise be determined from the base address of a corresponding array object 30. For example, information stored in a header of array object 30A may be used to determine the location of transactional locks 42A(1)-42A(M). The storage of information in a header of array object 30A may allow for integration with a garbage collector.

In one embodiment, each transactional lock 42A(1)-42A(M) includes an indication that indicates whether a corresponding portion 50(1)-50(M) is presently locked or unlocked. For portions 50(1)-50(M) that are presently locked, corresponding transactional locks 42A(1)-42A(M) may include indicators of the transactions 20 that hold the locks. For portions 50(1)-50(M) that are presently unlocked, corresponding transactional locks 42A(1)-42A(M) may include version numbers of the portions 50(1)-50(M) that may be used to validate read accesses to portions 50(1)-50(M).

Referring back to FIG. 3A, STM library 14 acquires a transactional lock 42A(i), where 1<=i<=M, corresponding to the access for transaction 20 as indicated in a block 66. After creating the array 42A of transactions locks 42A(1)-42A(M), STM library 14 identifies the portion 50(i) being accessed by transaction 20 and locks the portion 50(i) for transaction 20 by setting the lock indication of transactional lock 42A(i) and storing an indicator that identifies the transaction 20. STM library 14 prevents other transactions 20 from accessing the portion 50(i) while the portion 50(i) is locked.

If the array 42A of transactions locks 42A(1)-42A(M) has already been created as determined in block 62 above, STM library 14 determines whether the portion 50(i) of the array object 30A is locked by another transaction 20 before acquiring the transactional lock 42A(i) for the current transaction 20 as indicated in a block 68. If the portion 50(i) is locked by another transaction 20, STM library 14 does not acquire transactional lock 42A(i) for the transaction 20 as indicated in a block 69. STM library 14 may detect such a scenario as a conflict between transactions 20 and perform contention management. If the portion 50(i) is not locked by another transaction 20, STM library 14 acquires transactional lock 42A(i) as indicated in block 66 or may update transactional lock 42A(i) if the portion 50(i) is already locked by the current transaction 20.

STM library performs the functions of FIG. 3A for each write or pessimistic read access received from each transaction 20. Accordingly, STM library 14 may acquire different transactional locks 42A(1)-42A(M) for different transactions 20 concurrently and/or multiple transactional locks 42A(1)-42A(M) to the same transaction 20. As a result, different transactions 20 may hold locks to different portions 50 of array object 30A at the same time and may access the portions 50 concurrently.

Figure 4:
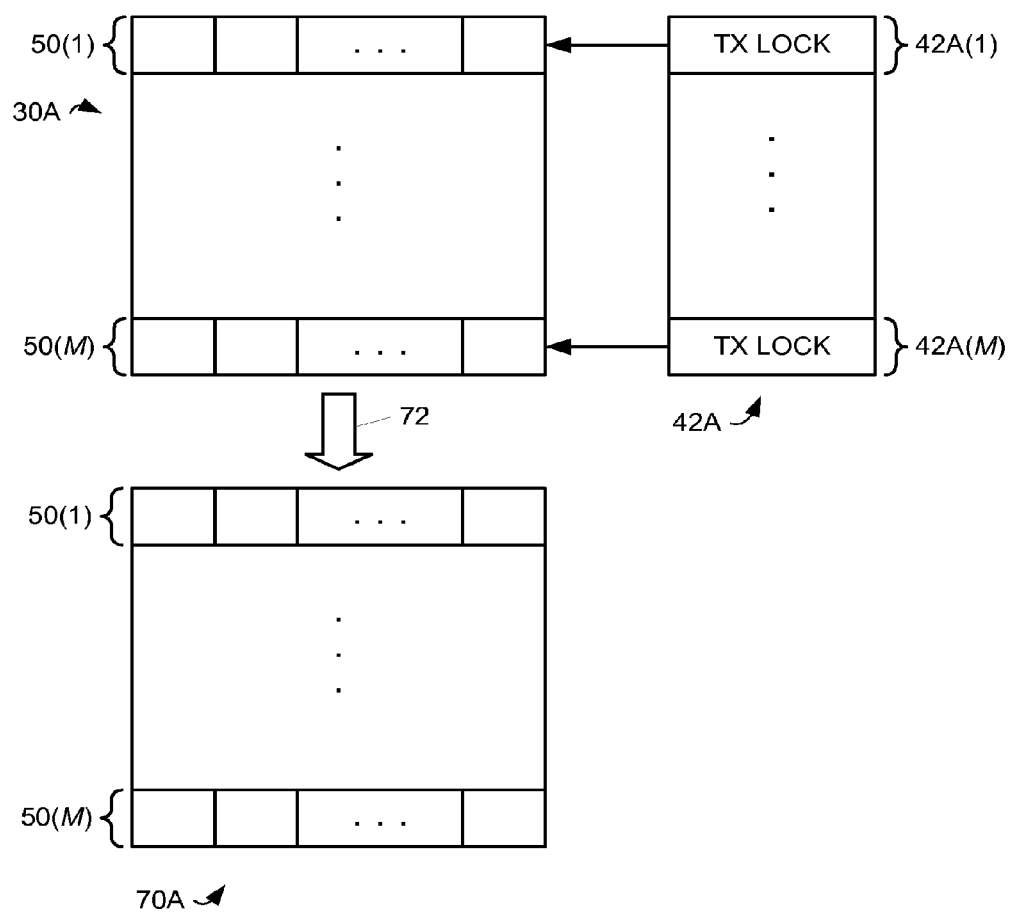
FIG. 4 is a block diagram illustrating an embodiment of performing write accesses in a software transactional memory system with an array of transactional locks for each array object.

As described above, STM library 14 creates a shadow copy for write accesses in a buffered write mode of operation and an undo copy for write accesses in an in-place write mode of operation. FIG. 4 is a block diagram illustrating an embodiment of performing write accesses in STM system 10 with an array 42A of transactional locks 42A(1)-42A(M) for each array object 30A.

When array object 30A is being updated by transactions 20, STM library 14 creates a shared copy 70A of array object 30A as indicated by an arrow 72. In a buffered write mode of operation, the shared copy 70A forms a shared shadow copy and STM library 14 uses shared shadow copy 70A for all read and write accesses to array object 30A for all transactions 20. All transactions 20 access shared shadow copy 70A for all read and write accesses in the buffered write mode of operation. In an in-place mode of operation, the shared copy 70A forms a shared undo copy and STM library 14 uses shared undo copy 70A to store undo copies of all portions 50 of array object 30A from all transactions 20. All transactions 20 access array object 30A for all read and write accesses in the in-place mode of operation.

Because portions 50(1)-50(M) may be individually locked using transactional locks 42A(1)-42A(M), each portion 50(1)-50(M) may be updated by only one transaction 20 at a time. As a result, all transactions 20 may write to portions 50(1)-50(M) in shared copy 70A in the buffered write mode of operation or in array object 30A in the in-place mode of operation using transactional locks 42A(1)-42A(M) without allocating and maintaining individual shadow or undo copies of array object 30A. Transactions 20 may also commit locked portions 50(1)-50(M) to array object 30A prior to releasing transactional locks 42A(1)-42A(M).

For nested transactions 20 that access array objects 30A where a shared copy 70A has been created in a buffered write mode of operation, STM library 14 may store separate undo copies of accessed portions of shared copy 70A rather than create an additional shared shadow copy for each nested transaction 20. STM library 14 uses the separate undo copies to restore shared copy 70A for nested transactions 20 that rollback and/or abort.

For nested transactions 20 that access array objects 30A where a shared copy 70A has been created in an in-place mode of operation, STM library 14 may store separate undo copies of accessed portions of array object 30A rather then store undo copies in shared copy 70A for each nested transaction 20. STM library 14 uses the separate undo copies to restore array object 30A for nested transactions 20 that rollback and/or abort.

FIG. 3B illustrates a method for performing optimistic read accesses to an array object 30A. In FIG. 3B, a determination is made by STM library 14 as to whether an optimistic read access to an array object 30A from a transaction 20 is detected as indicated in a block 73. When STM library 14 detects an optimistic read access to an array object 30A from a transaction 20, STM library 14 determines whether an array 42A of transactional locks for array object 30A have been allocated as indicated in a block 74. The first write or pessimistic read access to an array object 30A causes the array 42A of transactional locks to be created. If array 42A of transactional locks has not been created for array object 30A, then no previous write or pessimistic read accesses have been performed to array object 30A. Accordingly, STM library 14 causes the read access to be performed directly from array object 30A as indicated in a block 75. STM library 14 also logs the read access into the corresponding log 34R for validation.

If, at validation, the array 42A of transactional locks still has not been created for array object 30A, then STM library 14 determines that the read access is consistent because no write or pessimistic read access has been performed to the array object 30A that caused the array 42A to be created. If the array 42A of transactional locks has been created for array object 30A at validation, then STM library 14 ensure that a write access was not performed to the portion of the object 30A corresponding to the read access (e.g., by examining whether the transactional lock 42 has a version number of zero). If no such write access was performed, then STM library 14 determines that the read access is consistent.

If array 42A of transactional locks has been created for array object 30A, then a determination is made by STM library 14 as to whether the portion of array object 30A corresponding to the optimistic read access is locked as indicated in a block 76. If the portion is not locked, then STM library 14 causes the read access to be performed from the shared copy 70A in a buffered write mode of operation or from array object 30A in an in-place mode of operation as indicated in a block 77. If the portion is locked, then a determination is made by STM library 14 as to whether the portion of array object 30A is locked by the current transaction 20 as indicated in a block 78. If the object 30A is locked by the current transaction 20, then STM library 14 causes the read access to be performed from the shared copy 70A in a buffered write mode of operation or from array object 30A in an in-place mode of operation as indicated in block 77. If the object 30A is locked by another transaction 20, then STM library 14 detects a conflict between the current transaction 20 and the other transaction 20 as indicated in block 79.

Figure 5:
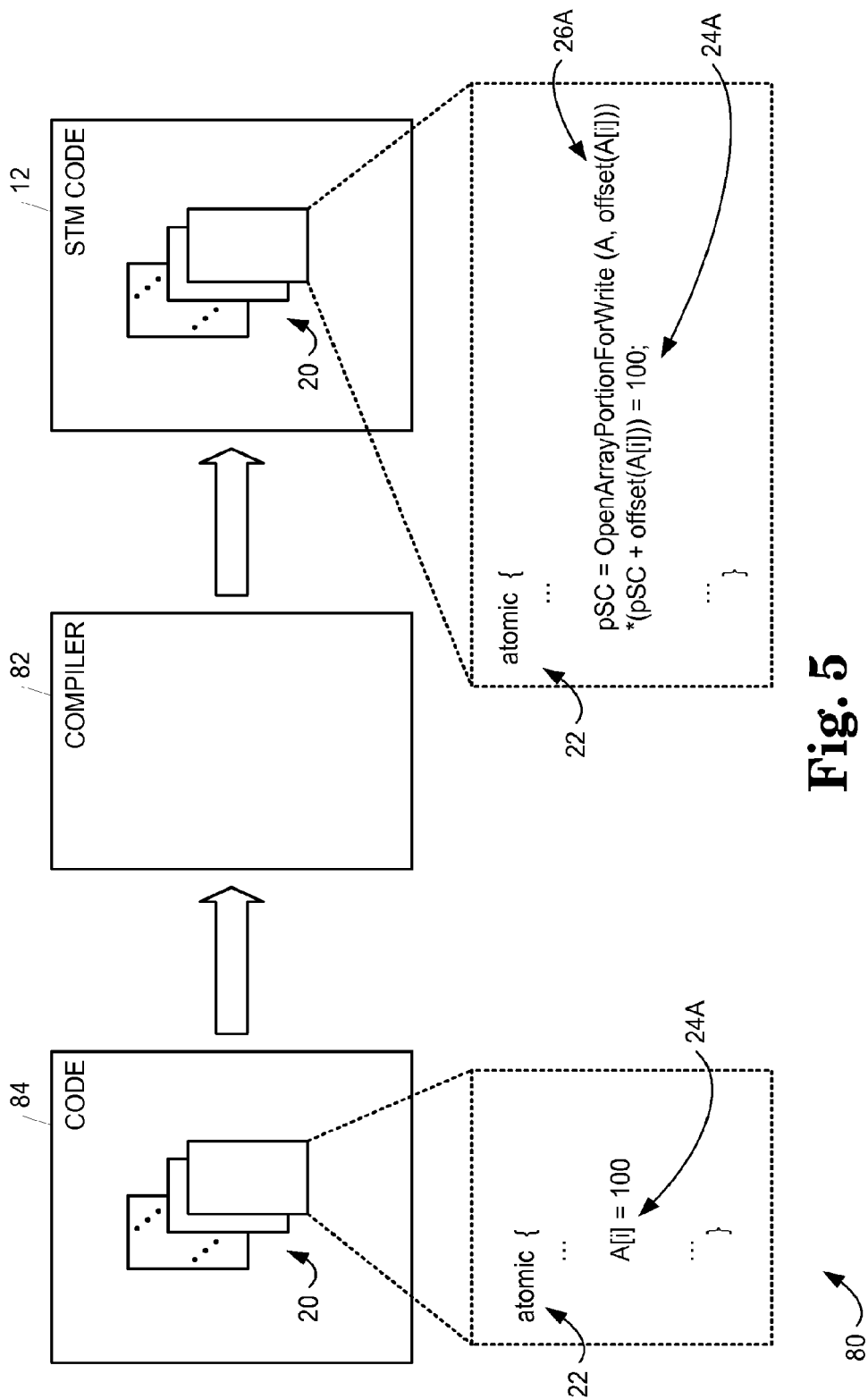
FIG. 5 is a block diagram illustrating an embodiment of a compiler system with a compiler that is configured to compile source code with software transactional memory transactions that include accesses to array objects.

FIG. 5 is a block diagram illustrating an embodiment of a compiler system 80 with a compiler 82 that is configured to compile source code 84 with STM transactions 20 that include accesses 24A to array objects 30A.

Compiler system 80 represents a compile mode of operation in a computer system, such as computer system 100 shown in FIG. 7 and described in additional detail below, where the computer system is executing instructions to compile code 84 into STM code 12. In one embodiment, compiler system 80 includes a just-in-time (JIT) compiler system that operates in the computer system in conjunction with a runtime environment executed by an operating system (OS), such as OS 122 shown in FIG. 7 and described in additional detail below, STM library 14, and any additional runtime libraries (not shown). In another embodiment, compiler system 80 includes a stand-alone compiler system that produces STM code 12 for execution on the same or a different computer system.

Code 84 includes a set of one or more STM transactions 20. Each STM transaction 20 includes an atomic block designator 22 that indicates to compiler 82 that a corresponding portion of code 84 is an STM transaction 20. Each STM transaction 20 may include zero or more memory accesses 24A that read from and/or write to an array object 30A. Code 84 may be any suitable source code written in a language such as Java or C# or any suitable bytecode such as Common Intermediate Language (CIL), Microsoft Intermediate Language (MSIL), or Java bytecode.

Figure 6:
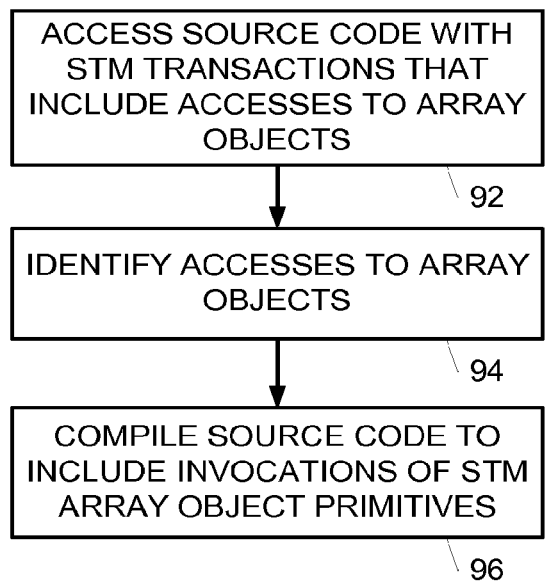
FIG. 6 is a flow chart illustrating an embodiment of a method for compiling source code with software transactional memory transactions that include accesses to array objects.

FIG. 6 is a flow chart illustrating an embodiment of a method for compiling source code 84 with transactions 20 that include accesses 24A to array objects 30A.

Compiler 82 accesses or otherwise receives code 84 with transactions 20 that include accesses 24A to array objects 30A as indicated in a block 92. Compiler 82 identifies accesses 24A to array objects 30A as indicated in a block 94. Compiler 82 compiles code 84 into STM code 12 with invocations 26A of STM array object primitives in STM library 14 for each access 24A as indicated in a block 96. The STM primitives for array objects 30A perform the functions described above with reference to FIGS. 2-4 including creating an array 42A of transactional locks for each array object 30A and creating a shared copy 70A for each written array object 30A. Although the invocation 26A shown in FIG. 5 corresponds to a write access to an array object 30A, other invocations 26A (e.g., OpenArrayPortionForRead) may be used for read accesses to array objects 30A. Compiler 82 performs any desired conversion of the set of instructions of code 84 into a set of instructions that are executable by a designated computer system and includes the set of instructions in STM code 12.

The use of a shared copy 70A in a write buffered mode of operation allows compiler 82 to address array object 30A and shared copy 70A in the same way because shared copy 70A is a full copy of array object 30A. Thus, compiler 82 may avoid addressing array object 30A and the individual shadow copies differently as may be the case if individual shadow copies of portions 50A were used for different transactions.

The above embodiments provide a method for achieving array object concurrency on STM system that otherwise uses object granularity. The STM system coordinates concurrent accesses to array objects (i.e., detect conflicts) and allows concurrency control to be conducted at a finer granularity than the object granularity.

The above embodiments may reduce memory consumption in logging the updates to array objects by using a shared copy for updated array objects.

Figure 7:
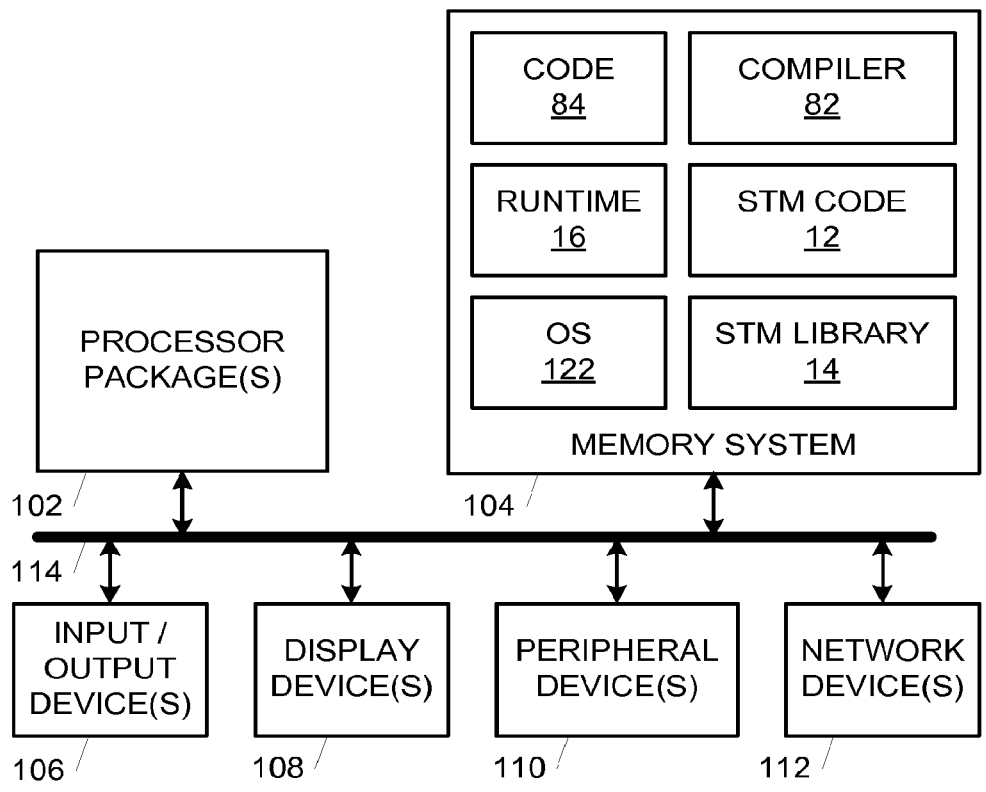
FIG. 7 is a block diagram illustrating an embodiment of a computer system configured to implement a software transactional memory system that uses transactional locks.

FIG. 7 is a block diagram illustrating an embodiment of a computer system 100 configured to implement STM system 10 that uses transactional locks.

Computer system 100 includes one or more processor packages 102, memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 each include one or more execution cores. Each execution core is configured to access and execute instructions stored in memory system 104. The instructions may include a basic input output system (BIOS) or firmware (not shown), OS 122, STM code 12, STM library 14, runtime environment 16, a compiler 82, and code 84. Each execution core may execute the instructions in conjunction with or in response to information received from input/output devices 106, display devices 108, peripheral devices 110, and/or network devices 112.

Computer system 100 boots and executes OS 122. OS 122 includes instructions executable by execution cores to manage the components of computer system 100 and provide a set of functions that allow programs to access and use the components. OS 122 executes runtime environment 16 to allow STM code 12 and STM library to be executed. In one embodiment, OS 122 is the Windows operating system. In other embodiments, OS 122 is another operating system suitable for use with computer system 100.

Computer system 100 executes compiler 82 to generate STM code 12 from code 84. Compiler 82 accesses or otherwise receives code 84 and transforms code 84 into STM code 12 for execution by computer system 100. Compiler 82 performs any desired conversion of the set of instructions of code 84 into a set of instructions that are executable by computer system 100 and includes the set of instructions in STM code 12. Compiler 82 also identifies blocks 20 in code 84 from transaction designators 22 and modifies blocks 20 in STM code 12 to include invocations of STM primitives 26.

In one embodiment, compiler 82 includes a just-in-time (JIT) compiler that operates in computer system 100 in conjunction with OS 122, runtime environment 16, and STM library 14. In another embodiment, compiler 82 includes a stand-alone compiler that produces STM code 12 for execution on computer system 100 or another computer system (not shown).

Code 84 may be any suitable source code written in a language such as Java or C#, any suitable bytecode such as Common Intermediate Language (CIL), Microsoft Intermediate Language (MSIL), or Java bytecode, or specific processor instructions.

Memory system 104 includes any suitable type, number, and configuration of volatile or non-volatile storage devices configured to store instructions and data. The storage devices of memory system 104 represent computer readable storage media that store computer-executable instructions including STM code 12, STM library 14, runtime environment 16, OS 122, compiler 82, and code 84. The instructions are executable by computer system 100 to perform the functions and methods of STM code 12, STM library 14, runtime environment 16, OS 122, compiler 82, and code 84 as described herein. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. Examples of storage devices in memory system 104 include hard disk drives, random access memory (RAM), read only memory (ROM), flash memory drives and cards, and magnetic and optical disks.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A software transactional memory (STM) system to create a plurality of transactional locks for a plurality of respective portions of an array object, the system comprising:
   one or more processors;
   a first component configured to, in accordance with a determining step, determine whether a single transactional lock or the plurality of transactional locks is to be allocated for an array object based on a size of the array object, the size of the array object being less than a size threshold indicating that the single transactional lock is to be allocated for the array object, the size of the array object being greater than the size threshold indicating that the plurality of transactional locks is to be allocated for the array object; and
   a second component, implemented using at least one of the one or more processors, configured to create a first transactional lock for a first portion of the array object in response to a call from a first transaction that accesses the array object, the second component further configured to create a second transactional lock for a second portion of the array object in response to a call from a second transaction that accesses the array object and further in response to a determination that the plurality of transactional locks is to be allocated for the array object and further in response to a determination that an array of transactional locks has not been created for the array object to permit concurrent access to portions of the array object.

2. The STM system of claim 1, wherein the second component is configured to include a version number in the first transactional lock in response to the first transaction committing.

3. The STM system of claim 1, wherein the first component is further configured to select a first subset of a set of elements of the array object to include in the first portion of the array object;
   wherein the first component is configured to select a second subset of the set of elements of the array object to include in the second portion of the array object; and
   wherein the first and the second subsets are mutually exclusive.

4. The STM system of claim 3, wherein the first component is configured to select the first and the second subsets in response to a hint from a transaction.

5. The STM system of claim 1, wherein the first component is further configured to partition the array object into first and second portions based on a threshold.

6. The STM system of claim 1, wherein the first transaction and the second transaction are same.

7. The STM system of claim 1, wherein the first component is configured to acquire the first transactional lock for the first transaction in response to the call from the first transaction that accesses the first portion of the array object; and
   wherein the first component is configured to acquire the second transactional lock for the second transaction in response to the call from the second transaction that accesses the second portion of the array object.

8. The STM system of claim 7, wherein the first component is configured to acquire the second transactional lock prior to the first transactional lock being released.

9. The STM system of claim 1, wherein the first component is further configured to create a shared undo copy of the array object that is accessible to the first transaction and the second transaction in an in-place write mode of operation.

10. A computer readable hardware device storing computer-executable instructions that, when executed by a computer system, perform operations comprising:
    in accordance with a determining step, determine whether a single transactional lock or a plurality of transactional locks is to be allocated for an array object based on a size of the array object, the size of the array object being less than a size threshold indicating that the single transactional lock is to be allocated for the array object, the size of the array object being greater than the size threshold indicating that the plurality of transactional locks is to be allocated for the array object;
    acquire a first transactional lock for a first transaction that accesses a first portion of the array object in a software transactional memory (STM) system, the first transactional lock being created in response to a call from the first transaction; and
    acquire a second transactional lock for a second transaction that accesses a second portion of the array object, the second transactional lock being created in response to the call from the first transaction and further in response to a determination that the plurality of transactional locks is to be allocated for the array object and further in response to a determination that an array of transactional locks has not been created for the array object to permit concurrent access to portions of the array object.

11. The computer readable hardware device of claim 10, wherein the operations further comprise:
    select a first subset of a plurality of elements of the array object to be included in the first portion of the array object; and
    select a second subset of the plurality of elements of the array object to be included in the second portion of the array object;
    wherein the first portion and the second portion are non-overlapping.

12. The computer readable hardware device of claim 11, wherein the first subset and the second subset are selected based on a hint from a transaction.

13. The computer readable hardware device of claim 10, wherein the operations further comprise:
    create a shared undo copy of the array object that is accessible to the first transaction and the second transaction in an in-place write mode of operation.

14. The computer readable hardware device of claim 10, wherein the operations further comprise:
    including a version number in the first transactional lock based on the first transaction committing.

15. The computer readable hardware device of claim 10, wherein the first transaction and the second transaction are same.

16. The computer readable hardware device of claim 10, wherein the second transaction is different from the first transaction; and
    wherein the second transactional lock is created further in response to a call from the second transaction.

17. A system to create a number of transactional locks corresponding to an array object, the number depending on a size of the array object, the system comprising:
    one or more processors; and
    a compiler, implemented using at least one of the one or more processors, configured to access source code with a first software transactional memory (STM) transaction that includes an access to the array object, the compiler further configured to compile the source code to include an invocation of an STM array object primitive corresponding to the access in the first STM transaction, the STM array object primitive configured to create either a single transactional lock or an array of transactional locks corresponding to the array object depending on the size of the array object, the STM array object configured to create the single transactional lock corresponding to the array object if the size of the array object is less than a size threshold, the STM array object configured to create the array of transactional locks corresponding to the array object if the size of the array object is greater than the size threshold in response to a determination that the array of transactional locks has not been created for the array object to permit concurrent access to portions of the array object.

18. The system of claim 17, wherein the array of transactional locks includes a plurality of transactional locks that corresponds to a plurality of respective portions of the array object.

19. The system of claim 17, wherein the STM array object primitive is configured to create a shared undo copy of the array object that is accessible to the first STM transaction and a second STM transaction that is different from the first STM transaction in an in-place write mode of operation.

20. The system of claim 17, wherein the STM array object primitive is configured to include a version number in a first transactional lock of the array of transactional locks based on a transaction that corresponds to the first transactional lock committing.

\* \* \* \* \*